2,756,244
Patented July 24, 1956

2,756,244

19-NORANDROSTANOLONES AND PROCESS

Carl Djerassi, Birmingham, Mich., and Franz Sondheimer and George Rosenkranz, Mexico City, Mexico, assignors to Syntex, S. A., Mexico City, Mexico, a corporation of Mexico No Drawing. Application July 9, 1954,
Serial No. 442,434

Claims priority, application Mexico July 11, 1953

10 Claims. (Cl. 260—397.4)

The present invention relates to novel cyclopentanophenanthrene derivatives and to a process for their production.

More particularly, the present invention relates to the preparation of novel 19-nor-androstane derivatives and to the preparation of novel esters of 19-nor-androstane derivatives.

The novel compounds of the present invention unlike 19-nor-progesterone which has been shown to have several times the progestational activity of progesterone, possess androgenic properties of a lesser degree than for example, testosterone. The novel compounds of the present invention, however, retain the anabolic properties of the androgens and are therefore of great value in those instances where treatment with highly anabolic but weakly androgenic hormones is indicated.

In accordance with the present invention there has been prepared the novel compound 19-nor-androstan-17β-ol-3-one (19-nor-dihydrotestosterone) and esters thereof. There has also been prepared in accordance with the present invention novel esters of 19-nor-testosterone.

The following equation illustrates the process of the present invention:

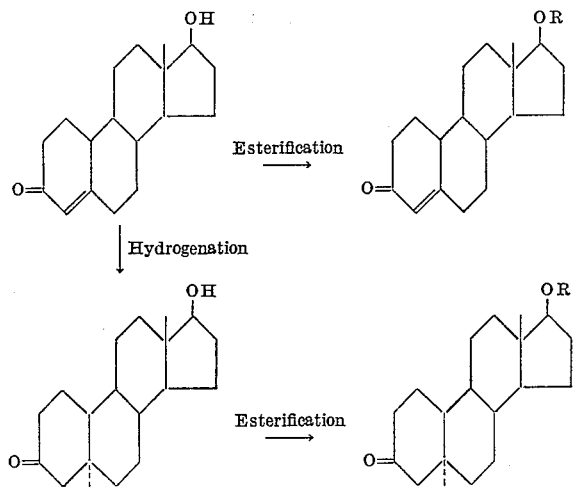

In the above equation R represents the residue of any hydrocarbon carboxylic acid conventionally forming steroid esters. Thus R is preferably a residue of a hydrocarbon carboxylic acid of less than nine carbon atoms derived from saturated or unsaturated, aliphatic, carbocyclic, or cycloaliphatic, aryl, arylalkyl, alkaryl, mono, di or polycarboxylic acids which form ester groups such as for example, formyloxy, dimethylacetoxy, trimethylacetoxy, butyryloxy, valeryloxy, heptanoyloxy, octanoyloxy, acetoxy, propionoxy, benzoxy, phenylacetoxy, toluoyloxy, cyclopentylformoxy, β-cyclopentylpropionoxy, acrylyloxy, cyclohexylformyloxy, the half and di-esters of maloic, maleic, succinic, glutaric and adipic acids and the like.

In practicing the process above outlined 19-nor-testosterone which may be prepared for example according to the method of Birch, Jour. Chem. Soc. 1950, pages 367 and 368 or which is obtained as an intermediate during the production of Δ⁴-19-nor-androstene-3,17-dione by the method of United States application Serial No. 320,154, filed November 12, 1952, was added to prehydrogenated palladium on charcoal catalyst in an organic solvent such as ethanol. The mixture was then hydrogenated at room temperature and atmospheric pressure until one mol of hydrogen was absorbed. Separation of the catalyst and purification gave the desired 19-nor-androstan - 17β - ol-3-one (19-nor-dihydrotestosterone).

The 19-nor-testosterone could also be hydrogenated by adding the compound dissolved in an anhydrous organic solvent such as tetrahydrofurane slowly to liquid ammonia containing an alkali metal such as lithium metal as will be hereinafter set forth in detail.

Either the starting compound, namely 19-nor-testosterone or the product of the above-outlined steps, namely 19-nor-dihydrotestosterone can be esterified by treating with an appropriate anhydride or acyl chloride as set forth in the subsequent examples.

The following specific examples serve to illustrate but are not intended to limit the present invention:

Example I 200 mg. of palladium on charcoal catalyst was prehydrogenated in 25 cc. of ethanol previously distilled over Raney nickel (any other appropriate solvent can be used instead of ethanol) and then 1 g. of 19-nor-testosterone was added. The mixture was hydrogenated at room temperature and atmospheric pressure until one mol of hydrogen had been absorbed. The catalyst was filtered and the solution was evaporated to dryness. Chromatography of the residue in a column of activated alumina yielded 19-nor-androstan-17β-ol-3-one (19-nor-dihydrotestosterone).

Example II

A solution of 2 g. of 19-nor-testosterone in 40 cc. of tetrahydrofurane was added dropwise and under continuous stirring to a mixture of 200 cc. of liquid ammonia and 0.5 g. of lithium metal. The stirring was continued for 15 minutes longer, the excess of lithium was destroyed by the addition of t-butanol and the ammonia was evaporated. The residue was extracted with ether and the solution was washed with dilute hydrochloric acid, with aqueous sodium carbonate solution and water, dried over sodium sulphate and evaporated to dryness. The residue was chromatographed in a column of activated alumina, thus giving 19-nor-androstan-17β-ol-3-one (19-nor-dihydrotestosterone).

Example III 1 g. of 19-nor-testosterone dissolved in 5 cc. of pyridine and 1 cc. of acetic anhydride was heated for 1 hour on the steam bath. The solution was poured into water, heated to decompose the excess of acetic anhydride and extracted with ether; the ether solution was washed with very dilute hydrochloric acid, with aqueous sodium bicarbonate and water until neutral, dried over sodium sulphate and evaporated to dryness. In order to cleave the enol acetate at 3, the residue was dissolved in 5 cc. of dioxane containing 2 cc. of water and 0.5 cc. of hydrochloric acid and the solution was heated for 10 min. on the steam bath, cooled and poured into water. The product was extracted with ether and the ether layer was washed with sodium bicarbonate solution and water, dried over sodium sulphate and evaporated to dryness. The residue crystallized from hexane to give the acetate of 19-nor-Δ⁴-androsten-17β-ol-3-one (acetate of 19-nor-testosterone).

Example IV

Following the same method described in Example III, except that acetic anhydride was substituted by propionic anhydride, there was obtained the propionate of 19-nor-$\Delta^4$-androsten-17$\beta$-ol-3-one (propionate of 19-nor-testosterone).

Example V 1.5 cc. of $\beta$-cyclopentylpropionyl chloride was added dropwise under continuous stirring to a cooled solution of 1 g. of 19-nortestosterone in 3 cc. of pyridine. The mixture was stirred for a further 20 hours at room temperature, poured into water and the precipitate was filtered and washed until the smell of pyridine disappeared. The product was subjected to the acid cleavage with hydrochloric acid in dioxane, such as described in Example III. Chromatography of the product in a column with 30 g. of washed alumina afforded the $\beta$-cyclopentylpropionate of 19-nor-$\Delta^4$-androsten-17$\beta$-ol-3-one ($\beta$-cyclopentylpropionate of 19-nor-testosterone).

Example VI

A solution of 500 mg. of 19-nor-dihydrotestosterone in 2 cc. of pyridine and 0.5 cc. of acetic anhydride was heated for 1 hour on the steam bath. The solution was poured into water, heated to decompose the excess of acetic anhydride and extracted with ether; the ether solution was washed to neutral, dried over sodium sulphate, concentrated to a small volume and diluted with pentane, thus yielding the acetate of 19-nor-androstan-17$\beta$-ol-3-one (acetate of 19-nor-dihydrotestosterone).

Example VII

By the method described in Example VI, except that acetic anhydride was substituted by propionic anhydride, there was obtained the propionate of 19-nor-androstan-17$\beta$-ol-3-one (propionate of 19-nor-dihydrotestosterone).

Example VIII

The treatment of 1 g. of 19-nor-dihydrotestosterone by the method described in Example V, but without the acid cleavage mentioned in that example, afforded the $\beta$-cyclopentylpropionate of 19-nor-androstan-17$\beta$-ol-3-one ($\beta$-cyclopentylpropionate of 19-nor-dihydrotestosterone).

Other esters of 19-nor-testosterone and 19-nor-dihydrotestosterone are prepared by reacting the steroid with acid anhydrides or halides according to the above described acylation procedures. These esters include esters of hydrocarbon carboxylic acids containing less than nine carbon atoms derived from saturated or unsaturated, aliphatic, carbocyclic, or cycloaliphatic, aryl, arylalkyl, alkaryl, mono, di or polycarboxylic acids which form ester groups such as for example, formyloxy, dimethylacetoxy, trimethylacetoxy, butyryloxy, valeryloxy, heptanoyloxy, octanoyloxy, benzoxy, phenylacetoxy, toluoyloxy, cyclopentylformoxy, acrylyloxy, cyclohexylformyloxy, the half and di-esters of malonic, maleic, succinic, glutaric and adipic acids and the like.

We claim:

1. A process for the production of 19-nor-androstan-17$\beta$-ol-3-one which comprises treating 19-nor-$\Delta^4$-androsten-17$\beta$-ol-3-one with an agent capable of saturating the double bond thereof with hydrogen selected from the group consisting of hydrogen in the presence of a palladium catalyst and an alkali metal in ammonia.

2. The process of claim 1 wherein the agent is an alkali metal in ammonia.

3. The process of claim 1 wherein the agent is lithium in ammonia.

4. The process of claim 1 wherein the agent is hydrogen in the presence of a palladium catalyst.

5. A new compound selected from the group consisting of 19-nor-androstan-17$\beta$-ol-3-one and esters thereof with hydrocarbon carboxylic acids of less than nine carbon atoms.

6. 19-nor-androstan-17$\beta$-ol-3-one.

7. The esters of 19-nor-androstan-17$\beta$-ol-3-one with hydrocarbon carboxylic acids of less than nine carbon atoms.

8. The acetate of 19-nor-androstan-17$\beta$-ol-3-one.

9. The propionate of 19-nor-androstan-17$\beta$-ol-3-one.

10. The $\beta$-cyclopentylpropionate of 19-nor-androstan-17$\beta$-ol-3-one.

No references cited.